United States Patent [19]
Mechias

[11] Patent Number: 5,865,536
[45] Date of Patent: Feb. 2, 1999

[54] METHOD AND CONCHING MACHINE FOR INTRODUCING A SUBSTANCE INTO IT

[75] Inventor: Bernd Mechias, Braunschweig, Germany

[73] Assignee: Richard Frisse GmbH, Bad Salzuflen, Germany

[21] Appl. No.: 708,566

[22] Filed: Sep. 5, 1996

[30] Foreign Application Priority Data

Nov. 29, 1995 [DE] Germany .................. 195 44 415.9

[51] Int. Cl.⁶ .................. B01F 15/02; B08B 09/093; B08B 3/00
[52] U.S. Cl. .................. 366/150.1; 366/159.1; 366/177.1; 366/167.1; 99/348; 99/485; 426/631; 426/660; 134/22.18; 134/24; 134/25; 134/94; 134/22.14
[58] Field of Search .................. 99/348, 485; 426/631, 426/660; 134/22.18, 24, 25.3, 94.1, 104.2, 22.14; 366/150.1, 159.1, 177.1, 167.1

[56] References Cited

U.S. PATENT DOCUMENTS

| | | | |
|---|---|---|---|
| 4,357,111 | 11/1982 | Honemeyer et al. | 366/145 |
| 5,460,840 | 10/1995 | Capodieci et al. | 426/231 |
| 5,657,687 | 8/1997 | Callebaut et al. | 99/485 |

FOREIGN PATENT DOCUMENTS 0526771  2/1993  European Pat. Off. .

*Primary Examiner*—Carla J. Myers
*Attorney, Agent, or Firm*—Martin A. Farber

[57] ABSTRACT

A substance, particularly a cleaning substance, is to be introduced into a conching machine. This is done either by spraying the substance into the conching trough and/or by circulating a cleaning substance into and out of the conching trough so that a substantially homogenous distribution of the substance is achieved and/or a minimum amount of the cleaning substance is necessary.

18 Claims, 1 Drawing Sheet

METHOD AND CONCHING MACHINE FOR INTRODUCING A SUBSTANCE INTO IT

FIELD OF THE INVENTION

The invention is concerned with a method for introducing a substance into a conching machine which includes a conching trough and conching tools. When the term "conching machine" is used in this context, any apparatus shall be understood which serves the aim of refining and/or mixing a chocolate mass.

The invention is also concerned with a conching machine which comprises an outer frame; an inner wall on the frame which form a conching trough including at least one trough compartment; a conching shaft coaxially arranged with respect to the substantially cylindrical trough compartment; tools on the conching shaft which extend in radial direction towards the inner wall; and introducing means for a substance into the trough.

BACKGROUND OF THE INVENTION

In conching machines, whenever a chocolate mass or its recipe is changed, the conching machine has to be cleaned. In general, having finished a conching operation, the final chocolate, coating or the like is pumped off by means of a chocolate pump. After this, residues of the chocolate mass will remain at the inner wall surface of the conching machine and will adhere on the tools which, in general, are scraper, shearing and/or mixing tools. After pumping the finished chocolate mass off or permitting it to flow off, for example, within a conching machine of 6 ton volume about 25 kg of mass will remain in it and have to be removed. This is, because this fact proves to be interfering with changing the type of chocolate mass, particularly when switching over from a dark mass to a light-colored mass. In such cases, undesirable "blends" may occur, and colors may be carried over.

Heretofore, in order to clean the conching trough, an "intermediate mass" has been processed, thus performing rough cleaning. Subsequently, this "intermediate mass" was removed, and the conching trough was filled up with cocoa butter which was used for fine cleaning the trough.

Introduction of cocoa butter and of other substantially liquid substances, however, occurs also when conching a chocolate composition where an exact proportion of such a substance has to be added and homogenized within the mass which has already undergone a first or even a second conching step.

Usually, when fine cleaning a conching machine, the cocoa butter is emptied after running the conching shaft for a while. This procedure is both expensive with respect to energy consumption and requires also a large amount of cocoa butter which is expensive itself. It takes much time, and large amounts of "intermediate mass" will accrue and will have to be recycled in an appropriate manner. Alternatively, conching machines, i.e. the trough walls of them, are cleaned in a mechanical way, but expenditures are quite high.

For example, EP-A-0 526 771 discloses a conching machine whose covering lid is cleaned by means of scrapers. Such an arrangement is, however, not suitable for cleaning the inner wall surfaces of the conching trough.

SUMMARY OF THE INVENTION

Therefore, it is an object of the present invention to provide a method and a conching machine by which a substance, and in particular a cleaning substance, can be introduced into a conching machine in a simpler way than heretofore, and, if possible, in a smaller amount than usual up to now.

It is a further object of the present invention to provide a method and a conching machine by which cleaning of the inner surfaces of the trough and of the tools can be carried out in a simple, short-time and non-expensive way after changing the type of mass to be processed in the trough.

According to a first aspect of the present invention, these objects are attained by introducing the respective substance by spraying it at least over part of the conching trough. As a first result of spraying the substance, particularly cocoa butter or a substitute cleaning agent, i.e. in general a fat, such a soy fat or the like, an especially homogenous distribution of the introduced substance over the inner space of the trough will be achieved, i.e. unnecessary accumulations in one place are avoided. This, however, is the reason why this method of introducing can be applied to the step of adding a substance or additive (which is ordinarily more or less in liquid form) during the conching procedure where it is usual to add measured proportions of cocoa butter, of lecithin or even of milk. In the case of cleaning, however, a similar effect will result as when spraying water in a dish washer, i.e. a maximum cleaning effect is achieved using a minimum of liquid cleaning agent due to its powerful spraying jets.

In the latter case, a procedure will be particularly recommendable where the trough and/or the conching tools are sprayed with cocoa butter and/or a substitute as a cleaning substance after the respective conched chocolate mass has been drained off.

According to a second aspect of the present invention, a cleaning substance is introduced into the trough and is circulated through a circulation system which leads into and out of the trough. This circulation creates a flow force which entrains the residues of chocolate mass from the surfaces of the trough and of the tools, dilutes them in the cleaning substance on its way through the circulation path into and out of the trough and, at the same time, homogenizes the "blend" of mass and cleaning agent so that the latter is enabled to provide a cleaning action again when reintroduced into the trough. In this way, cleaning is more efficient and needs less cleaning agent, such as cocoa butter. Thus, in both aspects, enhanced flow characteristics are used to promote cleaning action, because in the latter case no further addition of fresh cocoa butter or its substitute is necessary after the first addition of this cleaning substance which will, in general, be a foodstuff compatible and/or fatty substance.

Preferably, the conching trough is filled with a certain amount of cocoa butter, say with 50 Liters, after having pumped off the conched chocolate mass by means of a chocolate pump. This may be done either over a conduit independent from the chocolate pump so that the introduced cleaning substance forms a supply within the conching trough which constitutes a supply space for the cleaning substance; or there is a special conduit leading to a supply tank or container. By means of the chocolate pump, i.e. the pump by which the conched chocolate mass is pumped off, the cocoa butter is conveniently recirculated trough a circulation system. It is preferred if the rotary motion of the respective conching shaft is employed for enhancing the cleaning procedure either by using the conching tools for scraping the sprayed cleaning substance off the inner trough wall and/or by spraying the cleaning substance out of nozzles rotating with the conching shaft by being either arranged on the shaft body itself and/or on its conching tools. Likewise, it is conceivable to have nozzles on the inner trough wall, e.g. stationary ones, although movable ones would also be possible. Of course, other arrangements would also be possible, such as including nozzles which project into the inner space of the trough, e.g. from above.

Preferably, cocoa butter is used as a cleaning agent. Nevertheless, other substances having a cleaning capability may be used, particularly if they are compatible with foodstuffs. In general, this will be the case with fat substances including, in particular, known fats which substitute cocoa butter, such as soy fat and other fats.

Although it would, in principle, be possible to carry out either spraying and/or recirculating manually, e.g. by means of conduits which project from outside into the conching trough, the objects of the invention are achieved in an especially simple way by a conching machine equipped with at least one spraying nozzle within the inner space of the conching trough, the nozzle being connectable with a supply space for the substance to be introduced via a conduit. Alternatively or in addition the conching trough may be equipped with a circulating conduit including a pump for pump circulating a fat as a cleaning substance.

According to a preferred embodiment, the circulation system of the conching machine comprises at least one controllable valve.

Suitably, the spraying nozzles have different spraying angles and/or directions, the angles or directions being chosen in such a way that the conching tools and the entire inner space of the trough are covered by the introduced cleaning substance while the conching tools are rotated.

Another preferred embodiment provides nozzles arranged on the inner wall of the conching machine.

Conveniently, the conching tools may be rotated together with the nozzles, i.e. the conching machine remains operating to achieve a better spraying and/or cleaning effect. Likewise, it is conceivable that the nozzles are stationary built in the inner wall of the conching machine, and are integrated into the circulation system.

When the cleaning procedure, preferably after a few minutes, has been terminated, the circulated fat or cleaning butter is drained off.

The benefit in comparison with known cleaning processes resides particularly in that cleaning can be done with only a small amount of expensive cocoa butter while, at the same time, taking only a very short time. Thus, the machine remains available for a longer time for further production. The constructional expenditure for carrying out the invention is extremely low, in particular if the chocolate pump, which is in most cases present anyway, is also used for circulation.

BRIEF DESCRIPTION OF THE DRAWINGS

Further advantages and characteristics of the invention will become apparent from the following description and the accompanying drawings in which embodiments are illustrated.

DETAILED DESCRIPTION OF THE DRAWINGS

Figure 1:
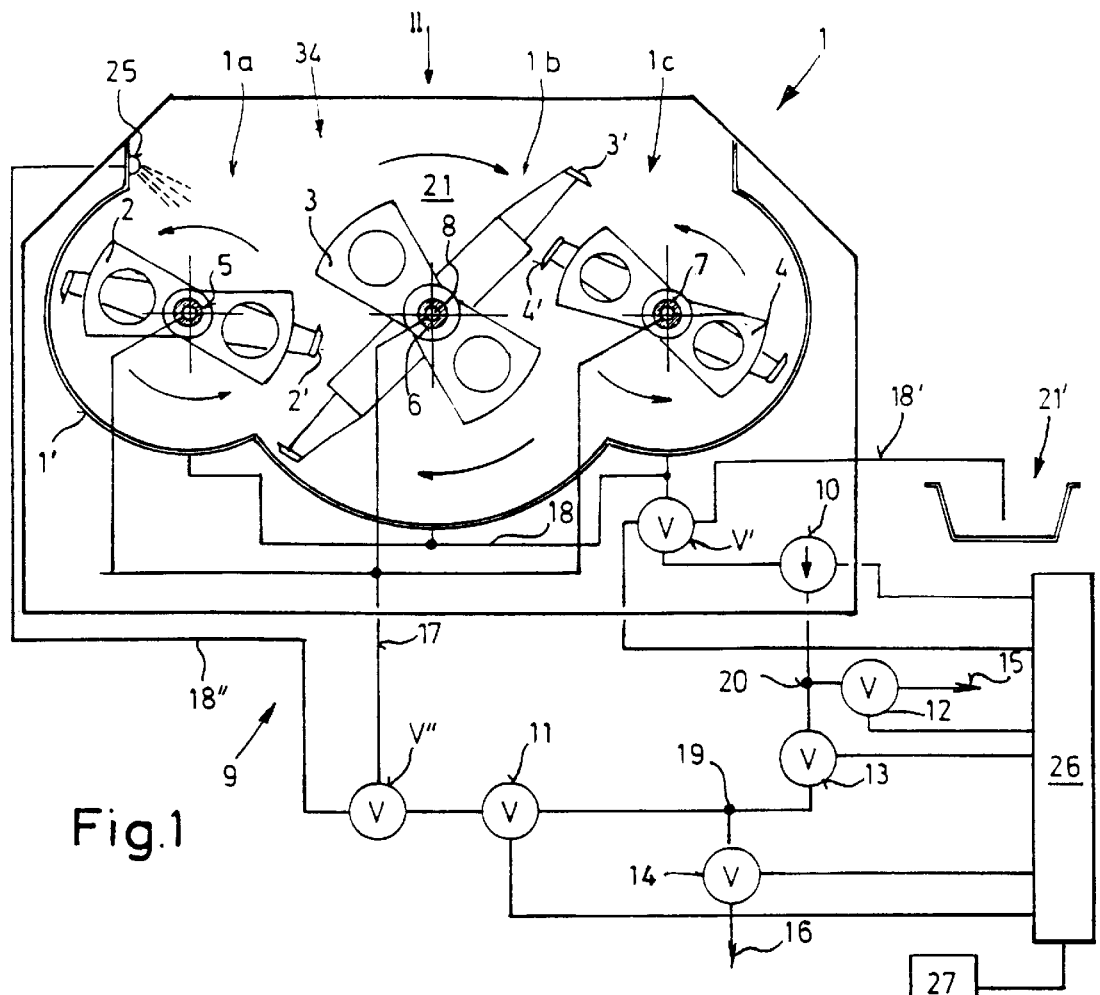
FIG. 1 is a schematic representation of a circulating system in connection with a conching machine shown in a cross-sectional view.

A conching machine, as shown in FIG. 1, comprises three conching shafts 5 to 7 having attached mixing blades 2, 3, 4 as well as shearing or scraper tools 2', 3' and 4' (whose function varies according to the direction of rotation) as conching tools as is known. The tools 2, 3 and 4 protrude radially from the shafts 5, 6 and 7. It has to be understood, however, that the conching machine has optionally only a single shaft, e.g. is equipped merely with the shaft 6, surrounded coaxially by at least partially cylindrical trough walls.

Figure 2:
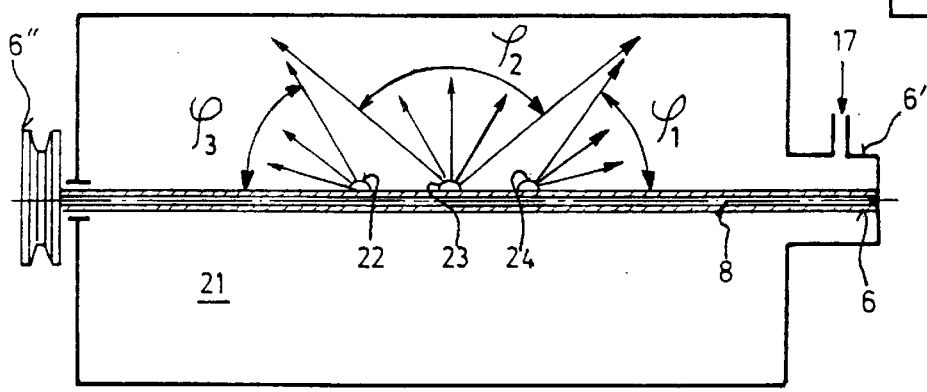
FIG. 2 illustrates the inner space of one trough compartment when seen in the direction of arrow II of FIG. 1, the conching tools being omitted for the sake of clarity.

The conching shaft 6 has an axial bore 8 extending in longitudinal direction which is connected to a swivel joint 6', as shown in FIG. 2. Alternatively, a stationary supply conduit will project into the bore 8, and the circumference of the conduit may optionally have a joint or bearing which co-operates with the inner surface of the bore 8. A similar arrangement is suitably also provided with the other conching shafts 5 and 7, although, in some cases, a single conching shaft might be adapted for cleaning, preferably in the manner shown in the drawings. As is apparent, each of the conching shafts 5 to 7 extends within in a trough space 1a, 1b and 1c which is at least approximately concentric to an axis extending through the respective shaft 5, 6 or 7. At one end of the respective shaft, a drive wheel, such as a gear wheel, is mounted which according to FIG. 2 is a V-belt 6".

A chocolate pump 10 communicates with a first suction conduit 18 and a second suction conduit 18' through a two-way valve V'. Through conduit 18', a cleaning agent, particularly cocoa butter, may be drawn off at least one supply container 21', which is merely schematically indicated, to convey the cleaning agent over a conduit 17 to at least one hollow conching shaft, in particular to all conching shafts 5 to 7. It has to be understood that two or more cleaning agents may be used, if necessary. If only one shaft 6 is provided with the cleaning substance and if the pressure of pump is sufficient to provide all trough spaces 1a to 1c from a single conching shaft with it for cleaning, the cleaning substance (in the case of three conching shafts) is preferably supplied to the middle conching shaft.

As soon as a certain amount of cleaning substance sufficient for the respective size of the conching machine has been supplied over the conduit 18', the valve V' is switched over so as to connect the pump 10 to the conduit 18. Alternatively, an appropriate amount of cocoa butter or any other substituting fat is fed via a separate conduit (not shown) into the inner space 21 of the conching machine, which acts then as the supply space, allowing it to circulate through conduit 18, pump 10 and conduit 17 in the manner described below. The cleaning substance flows then out of the inner space 21 of the conching trough, over the conduits 17 and 18 and into the respective bore 8. In this circulation path 9 for the fat (or other cleaning substance) acting as a scavenging agent, valves 11 and 13 are situated at two branchings 19 and 20 which comprise additional valves 14 and 12 for discharging chocolate at 15, on the one hand, and for the scavenging agent at 16, on the other hand. Alternatively, at least one pair of valves 12 and 13 or 11 and 14 can be replaced by a single two-way valve arranged within the conduit 17.

An additional or alternative measure can consist in the arrangement of spraying nozzles 25 (only one is represented) on the inner wall 1' of the trough, conveniently in the top region. Such spraying nozzles can be assigned to every trough compartment 1a, 1b or 1c. Their supply of a substance to be sprayed, such as a cleaning substance, is effected trough a branch conduit 18", optionally being enabled to be shut off by a way valve V'". Further, it is possible to provide spraying nozzles on the conching tools 2 to 4 and/or 2' to 4', these nozzles being in communication with the bore 8 and being, for example, integrated into the circulation path 9. For example, radially outwards directed spraying nozzles may be provided on the radially outer ends of the tools 2 to 4 and/or radially inwards directed nozzles could be provided on the inner surface of the conching tolls 2' to 4'.

Now, it is also possible in this way to introduce an additive, such as cocoa butter or lecithin, into the inner space 21 of the conching machine 1 during conching operation, to which end it is preferred to design the pump 10 as a volumetric pump in order to enable exact metering of the additive to the chocolate mass. Spraying of such an additive over the inner space 21 in the manner shown in FIG. 2 and or from above through the stationary nozzles 25 distributed over the trough wall 1' simplifies uniform distribution and homogenizing of the additive within the chocolate mass so that, at least in some cases, a better homogenized chocolate mass is attained with less mixing energy. This means that the spraying nozzles 22 to 25 shown are of special advantage independently from a cleaning procedure. It may be suitable to provide the respective nozzles 22 to 25 with a nonreturn valve in a similar way, as they are provided in car tires so that chocolate mass cannot enter the valve orifices (because the its nonreturn valve blocks in the direction from the trough towards the conduit 18), while, in contrast, the desired substance, such as a fat, can be introduced into the trough by biasing and opening the nonreturn valve.

Although it is possible, in principle, to actuate the valves 11–14, V', V" shown manually, it is preferred, if a control unit 26 is provided, which may contain a processor. This control unit 26 is controlled by a program memory 27 in a similar way as in a dish washer so as to achieve the cleaning procedure described below.

FIG. 2 shows the inner space 21 of the conching machine's 1 conching trough and the bore 8 within the conching shaft 6. It should be understood that, in the case of a conching machine 1 with more than one conching shaft 5, 6 or 7, each of these shafts may be designed in the manner described in the following, although a single conching shaft which is constructed in the manner shown in FIG. 2 may be sufficient, particularly if it is the central conching shaft, such as the conching shaft 6. The bore 8 is provided, for example, with three spraying nozzles 22, 23 and 24 which are directed in different directions and under different spraying angles φ1, φ2 and φ3 in order to ensure uniform distribution of the substance supplied. It is favorable, if spraying is effected under relatively high pressure for which reason it is quite possible within the scope of the present invention to have a high pressure pump arranged within the conduit 18 which is a separate pump besides the chocolate pump 10; practice has shown, however, that this will, in general, not be necessary and a single pump 10 will be sufficient so that this chocolate pump 10, which in most cases is provided anyway, can be used for a double purpose, thus saving additional costs.

Figure 3:
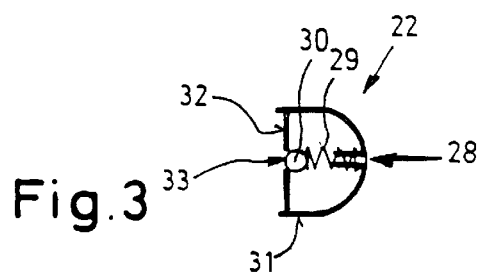
FIG. 3 a special embodiment of a spraying nozzle in an enlarged scale.

FIG. 3 illustrates how such a nozzle 22 may be constructed, particularly in case of using it for introducing an additive to the chocolate mass during conching procedure. This nozzle has a narrowing nozzle orifice 28 at the inner side of which a pressure spring 29 props against its wall and biases a ball 30 serving as a valve body of this nonreturn valve. The ball 30 props against an intermediate plate 32 inserted into the nozzle's body 31 and being, for example, soldered to it. The intermediate plate 32 in its center has an opening 33 shut by the ball 30 in the direction from the inner trough space 21, but opening in reverse direction by overcoming the force of spring 29.

A scavenging procedure for cleaning begins after pumping chocolate by means of the chocolate pump 10 over branching 20 and outlet 15 off in accordance with FIG. 1. Then, valve 12 is shut off by the control unit 26, and the inner space 21 of the conching machine 1 is filled with a certain (small, in comparison with the prior art) amount of scavenging agent or cleaning substance, such as cocoa butter. This might be done through a separate conduit not shown in this embodiment, for example from above through an opening 34 of the conching machine 1, but it is preferred to have the valve V' switched over by the control unit 26 in such a manner that the conduit 18' is in communication with the pump 10. Subsequently, the pump 10 switched on again by the control unit 26 (alternatively it could remain operating, and the respective valve only is switched over) so that the substance from the supply container 21' is pumped into the inner space 21. This scavenging agent or cleaning substance is led over the by-pass or circulation system 9, the control unit 26 as well as its program in memory 27 being adapted to open the valves 31 and 11 while closing valves 12 and 14. After the scavenging procedure, which takes several minutes, valve 14 is opened and valve 11 is closed so that the scavenging or cleaning agent may be discharged through outlet 16.

It should be noted that this procedure could, of course, modified in numerous ways. For example, it would be possible to use first only the nozzles 25 for introducing the substance in order to scavenge the conching tools 2 to 4 and 2' to 4' first, and then cleaning the inner wall 1' of the trough. In accordance with configuration and geometry, however, it might be more suitable to apply the procedure in a reversed order, and to clean the trough walls 1' first and afterwards to clean the conching tools 2 to 4 and 2' to 4', but this is, in general, not preferred. Preferred is, in fact, if all nozzles 22 to 25 are used simultaneously for spraying which is more time saving.

Certainly, cocoa butter or its substitute fats and lecithin have been mentioned as a substance to be introduced in the foregoing description. During conching, however, powdery substances, such as powder sugar or milk powder, have also often to be introduced and to be homogenized in the chocolate mass. In such a case, the nozzles 22 to 25 can also be used for this purpose if only the powder is kept in fluidized condition, i.e. in a liquid-like condition. If, in this way, air is also introduced into the chocolate mass through the nozzles 22 to 24 which are situated within the interior of the trough, this may have even an advantageous effect onto its taste. Thus, the scope of the present invention encompasses also introduction of air by nozzles into a conching machine's trough.

What is claimed is:

1. A conching machine for treating a chocolate mass, the machine comprising;

an outer frame;

inner wall means on said frame, said wall means forming a conching trough including at least one trough compartment, at least partially cylindrical with respect to an axis;

at least one conching shaft extending through said trough compartment in coaxial relationship to said axis to rotate therein, said conching shaft having a longitudinal bore;

tool means secured to said shaft and extending in radial direction therefrom to be rotated thereby relative to said wall means;

means introducing a substance into said conching trough, said introducing means including nozzle means in said conching trough for spraying said substance under predetermined spraying angles into said conching trough against said wall means and against a tool of said tool means; and conduit for connecting said nozzle means via said longitudinal bore to a supply of said substance.

2. A conching machine for treating a chocolate mass, the machine comprising:

an outer frame;

inner wall means on said frame, said wall means forming a conching trough including at least one trough compartment, at least partially cylindrical with respect to an axis;

at least one conching shaft extending through said trough compartment in coaxial relationship to said axis to rotate therein, said conching shaft having a longitudinal bore;

tool means secured to said shaft and extending in radial direction therefrom to be rotated thereby relative to said wall means;

means for introducing a substance into said conching trough, said introducing means including nozzle means in said conching through for spraying said substance under a predetermining spraying angle into said conching through;

conduit means for connecting said nozzle means via said longitudinal bore to a supply of said substance; and wherein said nozzle means comprise at least two nozzles of different spraying characteristics to spray said substance onto at least one of said tool means, and said wall means serves as a target surface, said spraying characteristic being chosen from spraying angle and spraying direction.

3. Conching machine as claimed in claim 2, wherein said introducing means further comprise pump means within said conduit means, said pump means including a volumetric pump.

4. Conching machine as claimed in claim 2, wherein said conching shaft has a longitudinal bore, at least one of said nozzles being disposed on said conching shaft in communication with said longitudinal bore.

5. Conching machine as claimed in claim 2, wherein said conching shaft has a longitudinal bore, and said conching shaft comprises swivel joint means for introducing said substance into said longitudinal bore.

6. Conching machine as claimed in claim 2, wherein different spraying characteristics are selected to spray said substance onto said tool means.

7. Conching machine as claimed in claim 2, wherein different spraying characteristics are selected to spray said substance onto said wall means.

8. Conching machine as claimed in claim 2, wherein different spraying angles are selected to spray said substance onto substantially the entire target surface.

9. Conching machine as claimed in claim 2, wherein at least one of said nozzles is arranged on said wall means.

10. Conching machine as claimed in claim 2, wherein said conduit means comprise at least one controllable valve means.

11. Conching machine as claimed in claim 10, further comprising control means for controlling said valve means, and program memory means connected to said control means for enabling control of said valve means in a programmed manner.

12. A conching machine for treating a chocolate mass, the machine comprising:

an outer frame;

inner wall means on said frame, said wall means forming a conching trough including at least one trough compartment which is open at a top thereof for receipt of said chocolate mass to be conched, said at least one trough compartment being at least partially cylindrical with respect to an axis;

at least one conching shaft extending through said trough compartment in coaxial relationship to said axis to rotate therein;

tool means secured to said shaft and extending in radial direction therefrom to be rotated thereby relative to said wall means; and circulating means for circulating a cleaning substance introduced into said conching trough into and out thereof, said circulating means including conduit means having an inlet opening and at least two outlet openings such as to lead said cleaning substance from said conching trough back into said conching trough; and pump means for moving said cleaning substance from said conching trough back into it, said circulating means being operative concurrently with a loading of said chocolate mass into said troughs wherein said two outlet openings include first and second outlet openings positioned relative to said trough for spraying said cleaning substance against a wall of said wall means and against a tool of said tool means.

13. A conching machine as claimed in claim 12, wherein said conduit means comprise first outlet means for selectively delivering chocolate mass such that said mass is introduced into the conduit means through said inlet opening, and is delivered through the first outlet means;

second outlet means for removing said cleaning substance from said circulating means; and selecting means for selectively guiding said chocolate mass to said first outlet means and said cleaning substance to said second outlet means.

14. A conching machine as claimed in claim 13, wherein said selecting means comprise at least one controllable valve means.

15. A conching machine as claimed in claim 14, wherein said selecting means comprise control means for controlling said valve means, and program memory means connected to said control means for enabling control of said valve means in a programmed manner.

16. A conching machine for treating a first substance, comprising:

a conching trough having an opening at an upper part of said trough for receipt of said first substance, at least a part of said trough being a cylindrical part;

a conching shaft extending through said cylindrical part parallel to a cylindrical axis of said cylindrical part;

a conching tool extending radially from said shaft and moving with rotational motion within said cylindrical part upon rotation of said shaft; and means including said opening for introducing said first substance into said trough, said introducing means further comprising nozzle means positional for directing a flow of a second substance interiorly of said trough in a direction towards a wall of said trough and in a further direction towards said conching tool.

17. A conching machine for treating a first substance, comprising:

a conching trough having an opening at an upper part of said trough for receipt of said first substance, at least a part of said trough being a cylindrical part;

a conching shaft extending through said cylindrical part parallel to a cylindrical axis of said cylindrical part;

a conching tool extending radially from said shaft and moving with rotational motion within said cylindrical part upon rotation of said shaft, said trough having an inlet and plural outlets to permit circulation of a second substance through said trough; and circulating means for circulating said second substance through said trough via said inlet and a first of said outlets to impinge upon a wall of said trough, and via a second of said outlets to impinge upon said conching tool.

18. A conching machine for treating a first substance, comprising:

a conching trough having an opening at an upper part of said trough for receipt of said first substance, at least a part of said trough being a cylindrical part;

a conching shaft extending through said cylindrical part parallel to a cylindrical axis of said cylindrical part;

a conching tool extending radially from said shaft and moving with rotational motion within said cylindrical part upon rotation of said shaft; and a plurality of nozzles of different spraying characteristics positioned relative to said trough for spraying a second substance on the interior surface of a wall of said trough and upon said conching tool.

* * * * *